United States Patent [19]
Rosenthal

[11] 3,929,479
[45] Dec. 30, 1975

[54] METHOD FOR IMPROVING THE PHOTOCONDUCTIVE PROPERTIES OF DYE SENSITIZED ZINC OXIDE

[75] Inventor: Fritz Rosenthal, Phoenixville, Pa.
[73] Assignee: SCM Corporation, New York, N.Y.
[22] Filed: Feb. 12, 1974
[21] Appl. No.: 441,806

[52] U.S. Cl. .................. 96/1.7; 252/501; 423/622
[51] Int. Cl.$^2$.... B31B 1/00; A01C 1/00; C01G 9/02
[58] Field of Search ......... 96/1.7; 423/622; 252/501

[56] References Cited
UNITED STATES PATENTS

| | | | |
|---|---|---|---|
| 3,197,307 | 7/1965 | Blake et al. | 252/501 |
| 3,467,603 | 9/1969 | Brown et al. | 96/1.7 |
| 3,511,648 | 5/1970 | Garrett | 96/1.7 |
| 3,622,341 | 11/1971 | Lee | 96/1.7 |

*Primary Examiner*—David Klein
*Assistant Examiner*—Alfonso T. Suro Pico
*Attorney, Agent, or Firm*—Armand G. Guibert; Milton M. Wolson

[57] ABSTRACT

Zinc oxide particles are ground in a hydrocarbon slurry having a mole ratio of hydrocarbon to zinc oxide greater than 1.0 in the absence of a resin binder and prior to admixture with a sensitizing dye. The sensitizing dye, in solution with a polar solvent, is admixed with the ground oxide slurry and sufficient nonpolar liquid — preferably an aromatic hydrocarbon, such as toluene — in the absence of a resin binder, such admixed slurry having a mole ratio of toluene to zinc oxide in excess of 2.0, whereby a high degree of adsorption of the sensitizing dye to the unmodified surface area of the zinc oxide particles is obtained. The excess toluene is removed by filtration or centrifuging and reused for processing subsequent batches of zinc oxide. The sensitized zinc oxide may then be combined with a resin binder for application as paper coatings and the like.

15 Claims, No Drawings

METHOD FOR IMPROVING THE PHOTOCONDUCTIVE PROPERTIES OF DYE SENSITIZED ZINC OXIDE

BACKGROUND OF THE INVENTION

The present invention relates in general to methods for improving the photoconductive properties of dye-sensitized zinc oxide, and more particularly to methods for grinding the zinc oxide and for dye sensitizing the zinc oxide in the absence of a resin binder, whereby improved adsorption of the sensitizing dye to the freshly ground surface of the zinc oxide particles is obtained.

DESCRIPTION OF THE PRIOR ART

Heretofore, papers have been coated with sensitized zinc oxide coatings for the direct electrostatic copying process. This process, known to the art, basically involves the application of a corona discharge to a sensitized zinc oxide layer, in the absence of light, to produce a uniform charge on the surface of the zinc oxide layer. A latent charge image is formed by exposure of the zinc oxide layer to light which dissipates the corona-induced charge in the illuminated areas to produce a charge image on the surface. The charge image is developed by contacting the coating with a toner system wherein oppositely charged toner particles are dispersed in a fluid stream, as of air or insulative hydrocarbon liquid. The oppositely charged toner particles are attracted to the charge image and deposited thereon to develop the image.

In the preparation of the zinc oxide layer, the particle size of the zinc oxide particles must be reduced to a level allowing the formation of a smooth nongritty coating. To obtain this desired level of particle size, the commercially available zinc oxide is ground as a slurry in a nonpolar liquid, such as toluene, in equipment conventionally used for this purpose, such as a Kady mill, a sand mill, a ball mill, or a paint mill.

It has been found long ago, that resins used as binders for these zinc oxide coatings serve as very effective dispersants in zinc oxide-hydrocarbon slurries. They also serve as very effective lubricants in the grinding process, thereby minimizing the power requirements of the grinding equipment and avoiding the formation of a paste, presumably caused by frictional charge phenomena.

For the above reasons, it has been common practice to grind zinc oxide in a hydrocarbon slurry in the presence of at least a portion of the resinous binder used to hold the pigment particles in a cohesive layer. In a typical case, the zinc oxide surface of the particles is exposed to 125 weight units of resin solids during the grinding process for each one weight unit of solid sensitizing dye added after completion of the grinding process.

It is evident that, under these conditions, the zinc oxide surface is coated with resin, thereby reducing the particle surface area available for adsorption of the sensitizing dye. It is a generally accepted truism that sensitizing dyes are most effective when adsorbed on the surface of the zinc oxide particles. Previous attempts to grind zinc oxide in a hydrocarbon slurry in the absence of a synthetic resin have failed because of the attendant problems of pasting already mentioned.

It is known from the prior art to pretreat or modify the surface of ground zinc oxide before adsorption of the sensitizing dye by adsorbing a Lewis acid onto at least a portion of the surface area of the zinc oxide particles. The sensitizing dye, dissolved in methanol, was then contacted with the Lewis acid modified surface of the zinc oxide. After adsorption of the dye, the resin binder was added. Such a treatment is disclosed in U.S. Pat. No. 3,197,307 issued July 27, 1965. This procedure suffers from the difficulty that the methanol has a great affinity for the dye and complete adsorption is not possible.

It is also known from the prior art to grind the zinc oxide in the absence of the resinous binder, but in the presence of a "supersensitizer" (i.e., not a sensitizing dye, but a sensitivity enhancer), as disclosed in U.S. Pat. No. 3,271,144 issued Sept. 6, 1966. The problem with this procedure is that an "aging" process of 8 to 10 hours is required and that, as admitted therein, the presence of binders tends to impede the progress of the reaction. Further, if the dye is added before or during the process of grinding with the supersensitizer, there may be a tendency to remove by abrasion some of the dye which would otherwise be adsorbed on the surface of the zinc oxide.

It is also known to dye-sensitize zinc oxide powder by contacting the zinc oxide particles with a methanol solution of the dye for about 24 hours at room temperature (3 hours at 100°–200 C) and then to filter the dyed particles, washing the filter cake with toluene to remove the excess dye while carefully keeping a layer of liquid above the filter cake at all times. The resultant washed powder is then dried for use in binders to make coatings for electrographic members. Such a process is disclosed in U.S. Pat. No. 3,238,141, issued Mar. 1, 1966. The time and care required in this process are evident, as well as the need for heating equipment.

SUMMARY OF THE PRESENT INVENTION

The principal object of the present invention is the provision of a method for improving the photoconductive properties of dye-sensitized zonc oxide.

In one feature of the present invention, zinc oxide is ground in a nonpolar liquid slurry in the absence of resin binder and prior to admixing with a sensitizing dye thus keeping the zinc oxide surface free for adsorption of subsequently added sensitizing dye.

In another feature of the present invention the freshly ground zinc oxide surface is contacted with a solution of sensitizing dye, in the absence of the resin binder and in an excess of nonpolar liquid such as toluene, whereby the affinity of the sensitizing dye for its polar solvent, such as methanol, is overcome by the excess amount of nonpolar liquid.

DESCRIPTION OF THE PREFERRED EMBODIMENTS

I have found that the problems arising from grinding zinc oxide in hydrocarbon slurries, in the absence of a resin binder, may be overcome by a very substantial increase in the ratio of hydrocarbon to zinc oxide in the grinding slurry (H:Z ratio). Thus, in an Osterizer blender, grinding was effected with a tolerable amount of pasting at a H:Z ratio of 3.6. This compares to a typical H:Z ratio of 0.8 used in conventional zinc oxide grindings in the presence of binder resin. The conventional zinc oxide grinding ratio of 0.8 happens to coincide with the ratio needed in the coating mix formula used as the charge to a paper coating machine for coating papers with sensitized zinc oxide coatings as used in electrostatic copying machines.

The consistency of the grinding slurry was further reduced by the addition of a very small amount of lecithin, a dispersing agent effective in organic liquids. Even at the increase in H:Z ratio, the temperature rise due to frictional heat was greater than in grinds in the presence of resins. Also, the power requirements are significantly larger. Thus, a blender rated at 425 watts handled zinc oxide grinds easily in the presence of resin, but burned out promptly when used for zinc oxide grinds in the absence of resin. No overheating was observed when the 425 watt blender was replaced by a 750 watt blender for grinding the resin-free slurry of the present invention. To summarize, it was found practical to grind zinc oxide in the absence of resin by increasing the amount of the hydrocarbon constituent of the slurry substantially over the amount needed in the coating formula. Thus, the mole ratio of hydrocarbon to zinc oxide in the zinc oxide grinding process of the present invention is greater than 2.0, and preferably in the range of 3.0 to 5.0.

It is known that the conventionally-used zinc oxide sensitizing dyes are soluble in polar organic solvents, such as aliphatic alcohols, and essentially insoluble in nonpolar liquids, such as toluene. I have found from adsorption experiments that 0.005 grams dye solids could not be completely adsorbed by the surface of 100 grams of zinc oxide slurried in 1000 ml methanol. On the other hand, when a fivefold amount of the dye (0.025 grams) was dissolved in 5 ml methanol and added to 100 grams zinc oxide slurried in 1000 ml toluene, the adsorption was complete as evidenced by the decolorization of the dye solution.

These phenomena are caused by the great affinity of sensitizing dye to methanol, which effectively interferes with dye deposition on the zinc oxide surface. I have found that this interference can be overcome by conducting the adsorption in a large excess of aromatic hydrocarbon, such as toluene. Theoretically, the larger the excess of the aromatic hydrocarbon, such as toluene, the less the adverse effect of the methanol, present as dye solvent, with respect to dye adsorption on the zinc oxide surface.

I have found that a 5.7 mole ratio of H:Z will be effective for this purpose. However, this ratio is not considered the bottom of the useful range. The bottom of the useful range is a ratio of approximately 2.0. In practice, it is proposed to add sensitizing dye, dissolved in methanol, to enough hydrocarbon so that the final H:Z ratio, which is approximately 3.6 in the ground slurry, is raised to 5.7 after the addition of sensitizing dye to the zinc oxide.

The sensitized zinc oxide slurry now contains hydrocarbon in great excess over the amount needed for coating the paper web. This excess is removed by filtration or centrifuging, and reused for processing subsequent batches of zinc oxide. The sensitized zinc oxide, after filtration and/or centrifuging, is processed wet into coating formulations, or air dried or oven dried prior to use.

The preparation of sensitized zinc oxide shall be illustrated by the following example:

EXAMPLE

Into a jar of an "Osterizer" blender is added 450 grams of toluene, 3 drops of lecithin 70, and 125 grams zinc oxide. The slurry is ground for 3 minutes at high speed. The temperature of the slurry rises from 70°F to 100°F during the grind. After the grind cycle, 5 ml of sensitizing dye solution (0.025 grams of dye dissolved in 5 ml of methanol) diluted in 265 grams of toluene is added to the zinc oxide slurry and while agitating the blender at low speed, dye adsorption occurs rapidly — for practical purposes instantly, as evidenced by the decolorization of the liquid. No "aging" is required, the resultant slurry then being filtered through a Buechner funnel. The filter cake of sensitized zinc oxide is air dried and mixed with resin binder and the amount of hydrocarbon required for the consistency needed for coating (H:Z ratio of about 0.8).

A paper coated with a ZnO/binder dispersion prepared according to the example and at a coating weight of 12 pounds per 3000 sq. ft., was subjected to the usual electrophotographic tests. The improvements achieved are evident from the following comparison of data:

|  | CONVENTIONAL PROCEDURE | PRESENT PROCEDURE |
|---|---|---|
| Contrast Ratio | 6.1 | 8.8 |
| Charge Acceptance | 320v | 360v |
| Speed T/2 | 15v | 5v |

The above-mentioned contrast ratio measurements are based, in known fashion, on the reflectance of a toned solid-area image as against a nonimage background area, say, a Macbeth RD-100 densitometer. The charge acceptance and speed are based, on the other hand, on noncommercial but equally known instrumentation using a conventional electrometer and corona source in conjunction with a recording voltmeter. The charge acceptance is the apparent surface voltage attained by the coated paper when subjected to a standardized corona exposure in the dark, while the speed is the value to which that voltage decays upon subsequent exposure to a standardized light source for a fixed length of time, T/2 (T being the exposure time corresponding to the time necessary to a constant residual voltage after exposure to light). For the equipment utilized in all my tests, the value of T/2 is six seconds.

The advantages of the coating of the present invention are that the coating has higher photographic speed, higher contrast ratio, significantly less background, improved charge acceptance, and lower weight per unit area having these aforecited quality improvements.

As will be clear to those skilled in the art, nonpolar liquids other than hydrocarbons — for instance, liquid polymeric silicon compounds — could be used as the carrier medium during the grinding and dye sensitization of the zinc oxide. Such other liquids are intended to fall within the scope of the invention as defined by the claims.

What is claimed is:

1. In a method for improving the photoconductive response of zinc oxide particles adaptable for dye sensitization and for admixture with a liquid binder for the preparation of photosensitized electrophotographic means, which process comprises the steps of:

grinding a slurry of zinc oxide particles in a nonpolar liquid, in the absence of a binder resin and prior to admixture with a sensitizing dye, said slurry having a mole ratio of nonpolar liquid to zinc oxide in excess of 2.0, admixing a solution of sensitizing dye in a polar solvent with said slurry of ground zinc oxide particles in nonpolar liquid to contact the surface area of the unmodified zinc oxide particles with the sensitizing dye for adsorption of the dye onto the surface area of the zinc oxide particles for snesitizing same.

2. The method of claim 1 including the step of incorporating into the slurry to be ground a dispersing agent effective in the liquid constituent of the slurry for dispersing the zinc oxide particles.

3. The method of claim 2 wherein the dispersing agent is lecithin.

4. The method of claim 1 wherein the nonpolar liquid is hydrocarbon.

5. The method of claim 4 wherein the hydrocarbon is toluene.

6. The method of claim 4 wherein the mole ratio of hydrocarbon to zinc oxide is in the range of 3.0 to 5.0 prior to admixture of the dye solution.

7. The method of claim 6 wherein the hydrocarbon is toluene.

8. The method of claim 1 including the step of:
admixing sufficient non-polar liquid to said dye solution to raise the mole ratio of nonpolar liquid to zinc oxide in the dye-sensitized slurry to a value in excess of 3.0

9. The method of claim 8 wherein the polar solvent is methanol and the nonpolar liquid is toluene.

10. In a method for improving the photoconductive response of dye-sensitized zinc oxide particles adaptable for admixture with a liquid binder for preparation of photosensitive electrographic means, which process comprises the steps of:
contacting the unmodified surface area of ground zinc oxide particles, in the absence of a resin binder, with a solution of polar solvent and sensitizing dye in a slurry of zinc oxide particles in an excess of hydrocarbon, the mole ratio of hydrocarbon to the zinc oxide being in excess of 2.0.

11. The method of claim 10 wherein the hydrocarbon is an aromatic hydrocarbon.

12. The method of claim 10 wherein the aromatic hydrocarbon is toluene.

13. The method of claim 10 wherein the mole ratio of hydrocarbon to zinc oxide is greater than 3.6.

14. The method of claim 10 wherein the polar solvent for the sensitizing dye is methanol.

15. The method of claim 14 wherein the hydrocarbon is toluene, and the mole ratio of toluene to zinc oxide is greater than 3.6.

* * * * *